United States Patent [19]

Becker

[11] 4,123,863
[45] Nov. 7, 1978

[54] PICTURE FRAME

[76] Inventor: Rolf Becker, Schillstr. 7, D 3440 Eschwege, Fed. Rep. of Germany

[21] Appl. No.: 750,148

[22] Filed: Dec. 13, 1976

[30] Foreign Application Priority Data

Apr. 23, 1976 [DE] Fed. Rep. of Germany ... 7612798[U]

[51] Int. Cl.² .............................................. G09F 1/12
[52] U.S. Cl. ...................................... 40/152; 403/401
[58] Field of Search ...................... 40/152, 155, 152.1; 403/401, 402

[56] References Cited

U.S. PATENT DOCUMENTS

| 1,934,532 | 11/1933 | Hallowell | 40/152.1 |
| 2,581,843 | 1/1952 | Edwards | 40/156 X |
| 2,659,991 | 11/1953 | Strayer | 40/152 X |
| 3,783,543 | 1/1974 | Hengren | 40/152 |

FOREIGN PATENT DOCUMENTS 925,292  5/1973  Canada .................................... 40/152

Primary Examiner—Russell R. Kinsey
Assistant Examiner—Wenceslao J. Contreras
Attorney, Agent, or Firm—Bacon & Thomas

[57] ABSTRACT

A quick-change picture frame, which for changing the picture has to be opened only at one corner and wherein miter cut elastic moldings are connected by a loosenable corner connecting piece at one corner and by firmly attached corner pieces at all other corners. Within the molding grooves are provided into which the edges of the corner pieces are fitted. The loosenable corner piece comprises a plate which is pivotably attached to the end section of one of the moldings, which form the openable corner, and has a guiding groove, which cooperates with a guide projection on the second molding of this corner in order to lock the corner piece when the frame is closed.

12 Claims, 4 Drawing Figures

PICTURE FRAME

BACKGROUND OF THE INVENTION

The invention relates to a quick-change picture frame comprising miter-cut moldings and a removable back panel, for accepting pictures or the like.

Quick-change picture frames have been described before, for example in the German Gebrauchsmuster No. 7,438,223, such frames are made up of individual moldings. By using individual moldings, it is possible to combine different pairs of moldings with different lengths to make frames of different sizes. Since, however, four moldings must be connected with each other in sequence, changing the picture requires considerable time and there is the possibility of individual moldings being damaged or lost before the frame is put together again.

Other known quick-change picture frames are composed of two parts, each of which comprises two frame moldings which are connected at one corner with one back panel. When putting the frame together, the back panels slide on top of one another. Owing to the double back panel, which must be provided for reasons of stiffness, such frames require a large amount of material and make the picture heavier. Furthermore, the means for guiding the two parts must be very carefully and accurately manufactured using strong and stable material, since otherwise, if the picture is changed many times, proper fitting together of the frame at the edges is not ensured. Furthermore, suitably constructed locking means are also necessary.

SUMMARY OF THE INVENTION

It is an object of the present invention to provide a quick-change frame without separate frame moldings.

It is a further object of the invention to provide a picture frame, which allows simple and quick changing of the picture in the frame.

Furthermore, it is an object of this invention to provide a frame which insures proper engagement at the edges even after repeated use.

In accomplishing the foregoing objects, there has been provided according to the present invention, a quick-change picture frame with miter-cut moldings and a removable back panel which comprises miter-cut moldings of elastic material and a loosenable, lockable corner connecting piece connecting two of the moldings at one corner and further, firmly attached corner connecting pieces connecting the moldings at all other corners. Preferably, the moldings each comprise at least within both their end sections at least one groove which runs parallel to the back panel surface and is open towards the inner side of the frame and into which the edges of the corner connecting pieces can be fitted. Preferably, the loosenable lockable corner connecting piece comprises a plate having a guiding groove therein which is pivotably attached to the end section of an adjacent molding, and the second molding adjacent to this corner comprises within its end section a guide projection which cooperates with the guiding groove of the corner connecting piece upon closing the frame.

Other objects, features and advantages of the invention will become apparent from the detailed description of preferred embodiments which follows, when considered together with the attached figures of drawings.

DETAILED DESCRIPTION OF THE INVENTION

Figure 1:
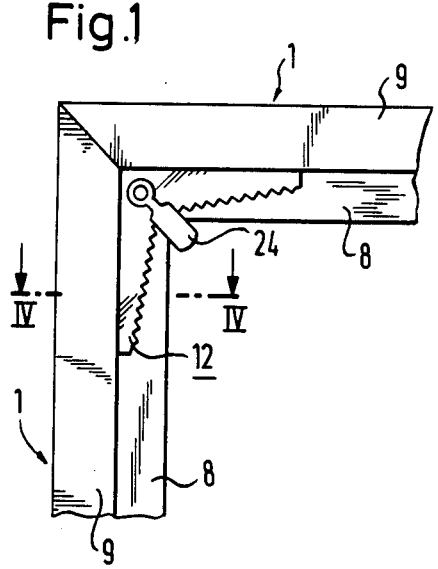
FIG. 1 shows a corner of a quick-change frame connected with a firmly fixed corner connecting piece.

The invention provides a quick-change picture frame without separate frame moldings so that even when the frame is undone, no moldings can be lost. With this frame, it is possible to change the picture simply and rapidly many times. For this purpose, it is only necessary to open one corner of the frame which is closed by a pivoting corner connecting piece which ensures at all times a proper connection with flush edges of this corner. Upon opening the frame at this corner, the frame moldings spring apart at this corner, whereas the moldings stay connected at all other corners, and as a result, all the moldings together surround the back panel with the picture covered by a glass plate in a loose annular fashion so that the glass plate, picture and back panel can be removed.

The closing of the frame is carried out in the same simple manner just by reversing the steps taken whereby the frame moldings at the undone corner have to be pressed against each other before the corner connecting piece is swung into position.

The quick-change picture frame according to this invention comprises miter-cut moldings of elastic material which are connected to each other by corner connecting pieces, namely by a loosenable, lockable corner connecting piece at one corner and by firmly attached corner connecting pieces at the other corners. The moldings preferably comprise, at both of their end sections, at least a groove which runs parallel to the back panel surface and preferably is shaped in such a manner that the edges of the corner connecting pieces which are inserted into them, can be held by clamping. Preferably, the edges of at least the loosenable corner connecting piece rest against the bottom and/or at least one of the free ends of the side walls of the grooves of the moldings, when the frame is closed.

In order to provide for easy and quick opening and closing of the frame, the loosenable corner connecting piece advantageously comprises a ring-shaped handle.

In order to provide, inter alia, for easy insertion of the edges of the corner connecting pieces into the grooves of the moldings, their side walls next to the back panel extend farther to the inside of the frame, merging into a spring strip which is bent toward the back panel.

The moldings of the frame are made of wood, metal, especially aluminium, or of other elastic materials, preferably a plastic material. A suitable plastic material is polypropylene.

According to a further preferred embodiment of the invention, the grooves of the moldings in their inner side wall next to the back panel have another profiled groove which runs parallel to the outer wall of the molding and is arranged at a distance from it, and the corner connecting pieces comprise correspondingly profiled projections preferably placed at a right angle with their edges, which fit into these secondary grooves when the corner connecting pieces are inserted into the grooves of the moldings. This permits rapid right-angled connection with proper flush edge engagement of the moldings to be connected firmly with each other on introducing the corner connecting pieces into the frame molding grooves. Since the projections of the corner connecting pieces fit into the secondary grooves in the lateral walls of the grooves of the moldings forming the corner, the production of such frames is substantially facilitated and accordingly, can also be carried out more rapidly.

Referring now to the drawings, the quick-change frame of this embodiment consists of four frame moldings 1 which are made of an elastic material, as for example a plastic like polypropylene with ends mitered at an angle of 45°. Each frame molding 1 has an outer wall 2, which has a small rib 3 extending over its whole length which is directed toward the inner side of the frame. The rib 3 serves as a hold for a glass plate 6 which preferably has rounded edges and covers the picture 4 on a back panel 5 serving as a solid support for the picture. The panel 5 rests on the free end of a spring strip 8. The spring strip 8 is connected to the free end of a wall 7 which extends toward the inner side of the frame parallel to the surface of the panel, and perpendicular to the outer wall 2. The spring strip 8 is bent toward the surface of the back panel. The outer wall 2 furthermore has a rib 9 which is parallel to the wall 7 and is placed with a clearance from the latter at the side remote from the picture. The wall 7 and the rib 9 serve as side walls of a groove 10, which is open toward the inner side of the frame and the bottom 11 of which is formed by the outer wall 2.

In order to achieve a corner connection between two molding ends 1 with mitered surfaces flush, corner connecting pieces 12, 12' are provided. The corner connecting pieces comprise a plate 13. The thickness of the plate 13 corresponds to the clearance width of the groove 10. On closing the frame, the edges 14, 14' of the plates 13 therefore, fit without any play into the grooves 10 of the moldings 1 of the frame so that shifting of adjacent moldings out of the plane of the picture is prevented.

Figure 2:
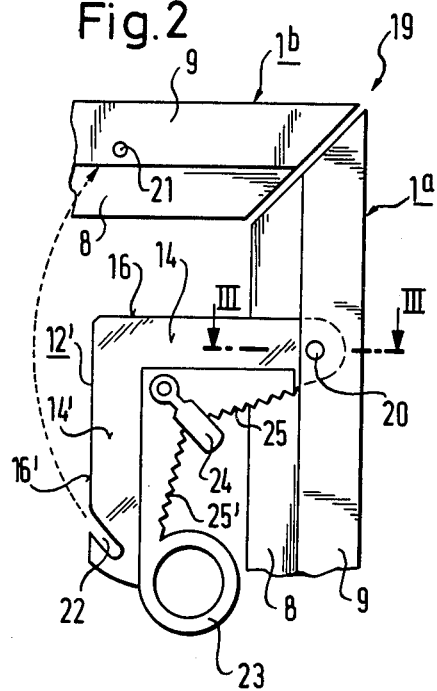
FIG. 2 shows a corner of the quick-change frame with a loosenable corner connecting piece in opening position.

On each plate 13, corresponding plates 15, which are however, smaller in size, are provided on the sides remote from the pictures. The thickness of the plates 15 corresponds to the height of the rib 9 at the groove 10. Instead of the plates 15, there can also be provided abutments of a height corresponding to the height of ribs 9. The plates 15 or, respectively, the abutments are placed on plate 13 at a distance from the outer edges 16, 16' of the edges 14, 14', which corresponds to the breadth of the rib 9. Thus, when the frame is completely closed with all its corner connecting pieces 12, 12' inserted, both the edges 16, 16' of the plate 13 are rested against the bottoms 11 of the molding grooves 10 and the free edge 17 of the rib 9 as well, is inserted against the end 18 of the plate 15. Accordingly, the proper angular setting of the frame moldings 1 is guaranteed at each corner. The corner connecting pieces 12 are fixed firmly at three corners to the frame moldings 1 by gluing, welding or another suitable type of connection. The fourth corner 19, which is formed by the ends of the frame moldings 1a and 1b is to be closed by means of a pivoting corner connecting piece 12'. The corner connecting piece 12' is placed in the groove 10 and is pivotable around a pin 20 toward the other molding 1b. The frame molding 1b has in its groove 10 a guide projection 21, which cooperates with a guide groove 22 in the plate 13 of the corner connecting piece 12' on closing the frame by pivoting of the corner connecting piece and locks it in the final position. On pivoting the corner connecting piece 12' (in the direction of the dashed arrow in FIG. 2), the edge pieces 14, 14' of the corner connecting piece 12' fit into the grooves 10 of the moldings 1a, 1b with a close fit. The groove, i.e., its side walls, can be constructed so that the corner connecting pieces are held in the groove with a clamping action.

In order to facilitate latching and unlatching the corner 19 by means of the corner connecting piece 12', the latter has a ring-shaped handle 23.

The spring strip 8 on the side wall 7 of the groove 10 serves three different functions. Firstly, it serves for facilitating introduction of the edges 14, 14' of the corner connecting pieces 12, 12' into the groove 10 of the frame moldings to be connected together at the corners. Secondly, it serves for compensating for differences in thickness between different pictures 4, back panels 5 and glass plates 6 by pressing them against the rib 3 of the frame moldings 1. At the same time, this being the third function of the spring strip 8, the corner edge which is formed between the resilient strip 8 and the wall 7 is pressed against the plate 13, thereby pressing the latter against the rib 9 so that the plate 13 is thereby fixed by clamping.

Figure 3:
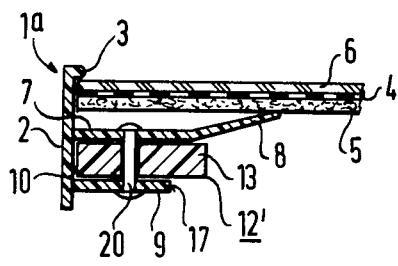
FIG. 3 shows a cross-section of the corner of FIG. 2 taken on the line along arrow III — III of FIG. 2 but with the corner connecting piece pivoted into closing position (on a larger scale)

In order to increase the depth effect of the picture, which can be achieved by allowing a larger space between the surface of the picture and the surface of the wall, the outer wall 2 of the frame molding can have a greater depth (as shown in FIG. 3), or the corner connecting pieces 12, 12' can have spacing pieces 24 which can be bent down and/or adjusted to permit the frame to hang a desired distance from the wall. Using the adjustable spacing pieces 24, it is also possible to compensate for unevenness in a wall surface.

For hanging the frame, the edges of the plates 15 which are directed toward the inner side of the frame comprise serrated slats 25, 25'. Preferably, the serrated edges include between them an angle of approximately between 110° and 180°. The frames are hung by means of two hooks or nails. By this design, it is possible to hang very large and therefore, heavy frames and also to arrange objects in the frame in such a manner that their center of gravity is not symmetrically placed. The nails or hooks are arranged at approximately the same height at a distance from each other which corresponds to the distance between the centers of the serrated edges 25 of the corner connecting pieces, which are located at the ends of that frame molding, which forms the upper edge of the frame. The heads of the nails or the ends of the hooks fit behind the plate 15 and prevent forward sliding, while the shanks lie in the gaps between the serrations and thus prevent any lateral sliding. For holding the picture at two points in the described manner, it is not necessary to drive two nails in at two points, at exactly the same level, something which is normally extremely difficult. Owing to the oblique arrangement of the serrated edges 25, 25' differences in level can easily be compensated for by a slight shifting to the right or to the left, since by this, the serration which is used as support on the one side is a somewhat lower one than the serration which is used on the other side.

Figure 4:
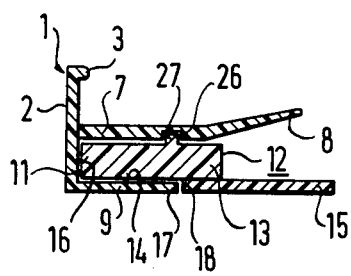
FIG. 4 shows a cross-section on the line along the arrow IV — IV of FIG. 1 (on a larger scale).

In the side wall 7 at the inner side of the groove 10, a profiled groove 26 can be placed parallel to the outer wall 2 and at a distance from it. This groove 26 can serve to receive suitably profiled projections 27 which are arranged on the corner connecting piece 12 at a right angle to its edges. The projections 27 are introduced into the groove 26 when the corner connecting piece 12 has been placed into closing position. This makes possible easy and rapid right-angled connection with flush edges of the moldings to be connected firmly on introduction of the corner connecting pieces 12 into the frame molding grooves 10 since the profiled projections 27 of the corner connecting pieces 12 snap into the correspondingly profiled grooves 26 of the side walls 7 of the frame moldings 1 forming the corner. Thus, the production of the frames is substantially facilitated, since centering which is otherwise necessary for connecting of the frame moldings with flush edges, is not necessary (see FIG. 4).

In the case of the illustrated embodiment, the assembly of the frame can be rapidly and easily carried out by simply fitting the corner connecting pieces into the grooves to form corner connections with flush edges and at the correct angle without any substantial time being required for centering. The four frame moldings remain connected with each other after opening the frame. By simple pivoting of the one loosenable corner connecting piece, the frame can easily be opened and closed again so that changing of the picture can be carried out without difficulty and without any substantial expenditure of time. To change the picture after pivoting the corner connecting piece 12' into opening position, the ends of the frame moldings 1a and 1b forming the corner 19 come apart and, if necessary, can be moved farther apart to a slight extent so that the whole frame is opened and the frame moldings only surround the glass plate, the picture and the back panel loosely like an open ring. Then the back panel with the picture and the glass plate can easily be removed in an upward direction by pressing slightly against the side which has been opened. To close the frame again, the operations are reversed.

What is claimed is:

1. A device for framing a generally planar object, comprising:
    (a) a plurality of resilient side molding pieces having miter-cut ends joined together end-to-end to form a plurality of joints, thereby forming a closed, generally planar frame configuration;
    (b) first means pivotably attached to the end section of one of said molding pieces at a location adjacent to a first one of said joints, said first means further including second means for engaging a portion of the other molding piece forming said first joint when said first means is pivoted into contact with said other molding piece, thereby resulting in a releasable joint; and
    (c) means for fastening together the remaining ends of said plurality of molding pieces to form unreleasable joints.

2. The frame device as defined by claim 1, further comprising a generally planar object-supporting member positioned in the space defined by said frame configuration.

3. The frame device as defined by claim 2, further comprising means associated with said molding pieces for holding said object-supporting member in the space defined by said frame configuration.

4. The frame device as defined by claim 3, wherein said moldings each comprise at least within both of their end sections at least one groove which is parallel to the plane of said object-supporting member and open toward the inner side of the frame configuration, said groove being adapted for receiving a portion of the fastening means at each point of joining.

5. The frame device as defined by claim 1, wherein the grooves in the molding pieces further comprise means for clamping said fastening means therein at each point of joining.

6. The frame device as defined by claim 1, wherein the edges of at least said releasable fastening means are adapted to rest in the fastened position against at least one surface of said molding pieces which faces toward the inside of said frame configuration.

7. The frame device as defined by claim 6, wherein said surface comprises the bottom of said groove in said molding pieces.

8. The frame device as defined by claim 6, wherein said surface comprises the edge of one of the side walls of said groove in said molding pieces.

9. The frame device as defined by claim 6, wherein said releasable fastening means further comprises a ring-shaped handle.

10. The frame device as defined by claim 6, further comprising means positioned on said molding pieces for resiliently urging said object-supporting member toward the front of said frame configuration.

11. The frame device as defined by claim 10, wherein said resilient urging means include a side wall of said groove adjacent to said object-supporting member which extends toward the inside of the frame and includes a spring strip which is biased toward the front of said frame configuration.

12. The frame device as defined by claim 11, further comprising a profiled groove in said groove side wall situated at a distance from the outer wall of the molding piece and parallel to it, and wherein said fastening means further comprise a projection profiled correspondingly to said profiled groove and situated as to fit in said second groove when the edges of the fastening means are inserted into the grooves of the molding pieces.

* * * * *